United States Patent
Lee et al.

(10) Patent No.: US 9,201,983 B2
(45) Date of Patent: Dec. 1, 2015

(54) APPARATUS AND METHOD FOR PROVIDING SEARCH PATTERN OF USER IN MOBILE TERMINAL

(75) Inventors: Sung-Chan Lee, Gyeonggi-do (KR); Jong-Min Lee, Gyeonggi-do (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 383 days.

(21) Appl. No.: 13/298,674

(22) Filed: Nov. 17, 2011

(65) Prior Publication Data

US 2012/0310981 A1 Dec. 6, 2012

(30) Foreign Application Priority Data

May 31, 2011 (KR) .................. 10-2011-0052491

(51) Int. Cl.
*G06F 17/30* (2006.01)
*G06Q 30/02* (2012.01)

(52) U.S. Cl.
CPC ...... *G06F 17/30964* (2013.01); *G06Q 30/0256* (2013.01); *G06Q 30/0261* (2013.01)

(58) Field of Classification Search
USPC ........................................ 707/705
See application file for complete search history.

(56) References Cited

U.S. PATENT DOCUMENTS

| | | | |
|---|---|---|---|
| 7,096,218 B2 * | 8/2006 | Schirmer et al. | 707/767 |
| 7,565,157 B1 * | 7/2009 | Ortega et al. | 455/456.2 |
| 7,685,144 B1 * | 3/2010 | Katragadda | 707/999.101 |
| 7,890,528 B1 * | 2/2011 | Khoshnevisan | 707/769 |
| 8,725,727 B2 * | 5/2014 | Wassingbo | 707/732 |
| 2008/0154612 A1 * | 6/2008 | Evermann et al. | 704/275 |
| 2009/0157419 A1 * | 6/2009 | Bursey | 705/1 |
| 2009/0234861 A1 * | 9/2009 | Ramer et al. | 707/10 |
| 2011/0143728 A1 * | 6/2011 | Holopainen et al. | 455/414.1 |
| 2011/0202514 A1 * | 8/2011 | Singh | 707/706 |
| 2011/0238665 A1 * | 9/2011 | Parikh et al. | 707/740 |

FOREIGN PATENT DOCUMENTS

JP 2005-157503 A 7/2009

OTHER PUBLICATIONS

Santi Phithakkitnukoon, Teerayut Horanont, Giusy Di Lorenzo, Ryosuke Shibasaki, and Carlo Ratti, Activity-Aware Map: Identifying Human Daily Activity Pattern Using Mobile Phone Data, A.A. Salah et al. (Eds.): HBU 2010, LNCS 6219, pp. 14-25, 2010, Springer-Verlag Berlin Heidelberg 2010.*

* cited by examiner

*Primary Examiner* — Robert Beausoleil, Jr.
*Assistant Examiner* — Hau H Hoang
(74) *Attorney, Agent, or Firm* — Cha & Reiter, LLC

(57) ABSTRACT

In a mobile terminal, user search information used in a Location Based Service (LBS) application is stored. A user search pattern is determined from the user search information. User search pattern information corresponding to search condition data is extracted and displayed when the search condition data are input in a search pattern mode of the LBS application.

10 Claims, 3 Drawing Sheets

APPARATUS AND METHOD FOR PROVIDING SEARCH PATTERN OF USER IN MOBILE TERMINAL

CLAIM OF PRIORITY

This application claims the priority under 35 U.S.C. §119 of an application entitled "Apparatus And Method For Providing Search Pattern Of User In Mobile Terminal" filed in the Korean Intellectual Property Office on May 31, 2011 and assigned Serial No. 10-2011-0052491, the contents of which are hereby incorporated by reference.

BACKGROUND

1. Technical Field

This subject matter relates to mobile terminals using a Location Based Service (LBS) application.

2. Description of the Related Art

In a typical LBS application of a mobile terminal, a user can input search words such as café, hospital, and parking lot to search for local entities corresponding to the search words. The LBS then extracts location information of suitable entities based on a current location of the mobile terminal using a Global Positioning System (GPS) satellite and a location of a certain zone using Geocoding. Further, the LBS application performs an operation of simply displaying search results based on the location information on map data, or simply storing the history with respect to the search results.

SUMMARY

Disclosed is a mobile terminal including a Location Based Service (LBS) application that employs prior user search patterns to facilitate searching.

In one aspect, a method implemented in a mobile terminal includes: storing user search information used in a Location Based Service (LBS) application; and displaying user search pattern information corresponding to input search condition data when the search condition data are input in a search pattern mode of the LBS application.

BRIEF DESCRIPTION OF THE DRAWINGS

The above and other aspects, features and advantages will be more apparent from the following detailed description taken in conjunction with the accompanying drawings, in which.

DETAILED DESCRIPTION

Figure 1:
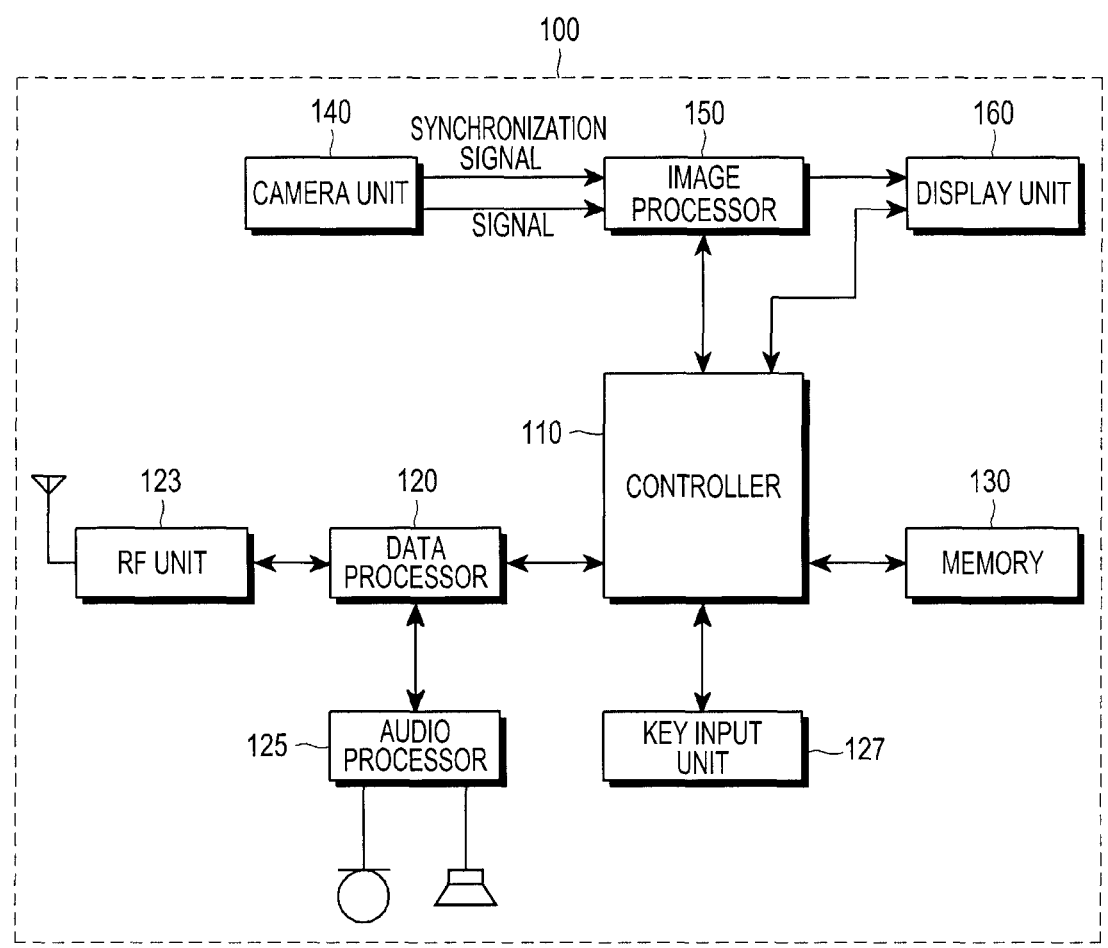
FIG. 1 is a block diagram illustrating an example configuration of a mobile terminal according to an embodiment.

Hereinafter, exemplary embodiments of the present invention will be described with reference to the accompanying drawings. In the following description, the same elements will be designated by the same reference numerals although they are shown in different drawings.

FIG. 1 is a block diagram illustrating an example configuration of a mobile terminal, 100, according to an embodiment of the present invention. As will be described in detail hereinafter, an LBS application runs on a controller 110. In some implementations, the LBS application collects and maintains a history (database) of prior user searches and search results, and generates search patterns based on the history. When the user starts a new LBS search, (e.g., in a special search pattern mode), a search pattern is consulted to facilitate the new search, whereby search results may be obtained more conveniently, accurately and faster. Example processes and display screen images set forth below will illustrate the utility of these implementations.

Herein, "user search information" can include a history of user searches, search results, and related information. "User search pattern information" refers to search results obtained from the user search information (e.g., extracted therefrom) based on generated search patterns. "Search condition data" refers to conditions of a current search. Search pattern information is generally obtained as a function of search condition data.

In FIG. 1, mobile terminal 100 electronics include the controller 110, a memory 130, a data processor 120, an RF unit 123, etc. Radio Frequency (RF) unit 123 executes an RF communication function of the mobile terminal 100. The RF unit 123 includes an RF transmitter up-converting a frequency of a transmitted signal and amplifying the signal, and an RF receiver low-noise-amplifying a received signal and down-converting the signal. A data processor 120 includes a transmitter encoding and modulating the transmitted signal and a receiver decoding and demodulating the received signal. That is, the data processor 120 may be configured by a modem and a codec. In this case, the codec includes a data codec processing packet data and an audio codec processing an audio signal such as a voice. The audio processor 125 plays a reception audio signal output from an audio codec of the data processor 120 or transmits a transmission audio signal created from a microphone to an audio codec of the data processor 120.

RF unit 123 and data processor 120 are further configured to handle communication with GPS satellites in order to receive LBS data signals. Note that a separate GPS communication unit with a dedicated antenna can alternatively be utilized for this function.

A key input unit 127 includes keys for inputting numerals and character information and function keys for setting various types of functions. The keys may be physical and/or virtual, with a touch screen presenting the virtual keys.

The memory 130 may be configured by a program memory and a data memory. The program memory may store programs for controlling a general operation of the mobile terminal and a program capable of extracting and displaying user search pattern information by using user search information used in an LBS application.

Further, the memory 130 stores the user search information used in the LSB according to some embodiments. The user search information can contain both search words and search results. The search results include, e.g., a search result place, locational information of the search result place, a search time, a search execution place, a category of a search word, and the number of search attempts for the search word. Herein, the number of times of searches may represents the number of search attempts for a current search, the number of times that searches have been recently executed for a particular search term, the number of search hits that a user is requesting for the search word, the number of search attempts a user would like, e.g., if the first attempt is unsuccessful, another attempt could be made after a preset waiting period.

The controller 110 executes a function controlling an overall operation of the mobile terminal 100. Controller 110 is configured by one or more processors, runs the LBS application, and performs algorithmic processing operations such as computing user search patterns based on search history. The controller 110 controls writing/reading of data to/from the memory 130 to cause the memory 130 to store the search words and the search results processed in the LBS application according to embodiments of the present invention.

In some implementations, the controller 110 creates a list of the user search information. The list includes the search words and the search results to which priorities are given according to respective frequencies with which the words have been searched and the results obtained and/or selected. The controller 110 may provide the list of user search information to the user, and the user is provided with suitable display selections to correct, delete, or add to the list of user search information.

In some implementations, if search condition data are input in one or more search condition input windows in a user search pattern mode of the LBS application, the controller 110 performs a control operation so that the user search pattern information corresponding to the search condition data is extracted from the user search information.

Note that the subject matter of the present invention is storing the user search information, which is used by the user in the LBS application, in the memory and when the user wants to know his life pattern, the controller extracts and displays the user search pattern information corresponding to the search condition input by the user in the memory.

For example, the user selects the search conditions as follows,

"search condition data: food>snack>Kimbap",
"search time: 18 to 21 o'clock" and
"the number of times of searches: more than 2 times"

The controller extracts and displays the user search pattern information corresponding to the above search conditions from the user search information stored in the memory.

At this time, "food>snack" by the search condition data is only the category for selecting "Kimbob", and the user does not want to know the most frequently used search condition data (i.e., a kind of food) from food by the user search pattern information, but the user wants to know a search execution place searched "18 to 21 o'clock", "more than 2 times" and "Kimbob" by the user search pattern information, so the mobile terminal displays this result in the map.

Therefore, present invention discloses extracting the user search pattern information corresponding to the search condition in the memory.

In some implementations, the controller 110 may perform a control operation to display the extracted user search pattern information with a marker on map data and to display basic information with respect to the user search pattern information together with the marker. The basic information may be information selected by the user from detailed information in relation to the user search pattern information. If a marker indicating the user search pattern information is selected, the controller 110 performs a control operation so that the detailed information with respect to the user search pattern information is displayed.

In some implementations, the controller 110 may perform a control operation so that the extracted user search pattern information is displayed in an augmented reality mode, the user search pattern information is displayed with a specific icon in the augmented reality mode, and basic information with respect to the user search pattern information is displayed together with the specific icon. The basic information may be information selected by the user from detailed information of the user search pattern information. If the specific icon displayed as the search pattern information of the user in the augmented reality mode is selected, the controller 110 performs a control operation to display the detailed information with respect to the user search pattern information.

The detailed information with respect to the user search pattern information can include a search place, location information of the search place, a search time, a search execution place, a category of a search word, and the number search attempts. The search time can be identified as the time that the user actually performed the search. Alternatively or additionally, a search time can be identified as hours of operation, i.e., a future time window in which the user desires to know which business establishments or the like provide a particular service. The search execution place is the location at which the search is actually executed.

A camera 140 includes a camera sensor for photographing a subject and converting an image of the photographed subject into an image signal, and a signal processor for converting an analog image signal from the camera sensor into digital data. A suitable camera sensor is a Charge Coupled Device (CCD) sensor or a complementary metal oxide semiconductor (CMOS) sensor, and the signal processor may be implemented by a Digital Signal Processor (DSP). The camera sensor and the signal processor may be implemented integrally or separately from each other.

The image processor 150 performs Image Signal Processing (ISP) for displaying an image signal output from the camera 140 on the display unit 160. The ISP realizes functions such as gamma correction, interpolation, spatial variation, image effect, image scale, AWB, AE, and AF. Accordingly, the image processor 150 processes an image signal output from the camera 140 for each frame, and outputs the frame image data according to characteristics and the size of a display unit 160. The image processor 150 includes an image codec. The image processor 150 compresses frame image data displayed on the display unit 160 in a preset scheme or restores compressed frame image data to original frame image data. In this case, the image codec may include a JPEG codec, an MPEG4 codec, a Wavelet codec, etc. The image processor 150 has an On Screen Display (OSD) function, and outputs OSD data corresponding to content displayed on a display screen of display unit 160 under the control of the controller 110.

The display unit 160 displays an image signal output on the image processor 150 on a screen. The display unit 160 displays user data output from the controller 110. The display unit 160 may use a liquid crystal display (LCD). In this case, the display unit 160 may include an LCD controller, a memory storing image data, and an LCD display element. When the LCD is implemented by a touch screen type, it may act as an input unit, and keys such as the key input unit 127 may be displayed on the display unit 160.

In some implementations, the display unit 160 displays a plurality of search condition windows for extracting the user search pattern information in a user search pattern mode of the LBS application.

Figure 2:
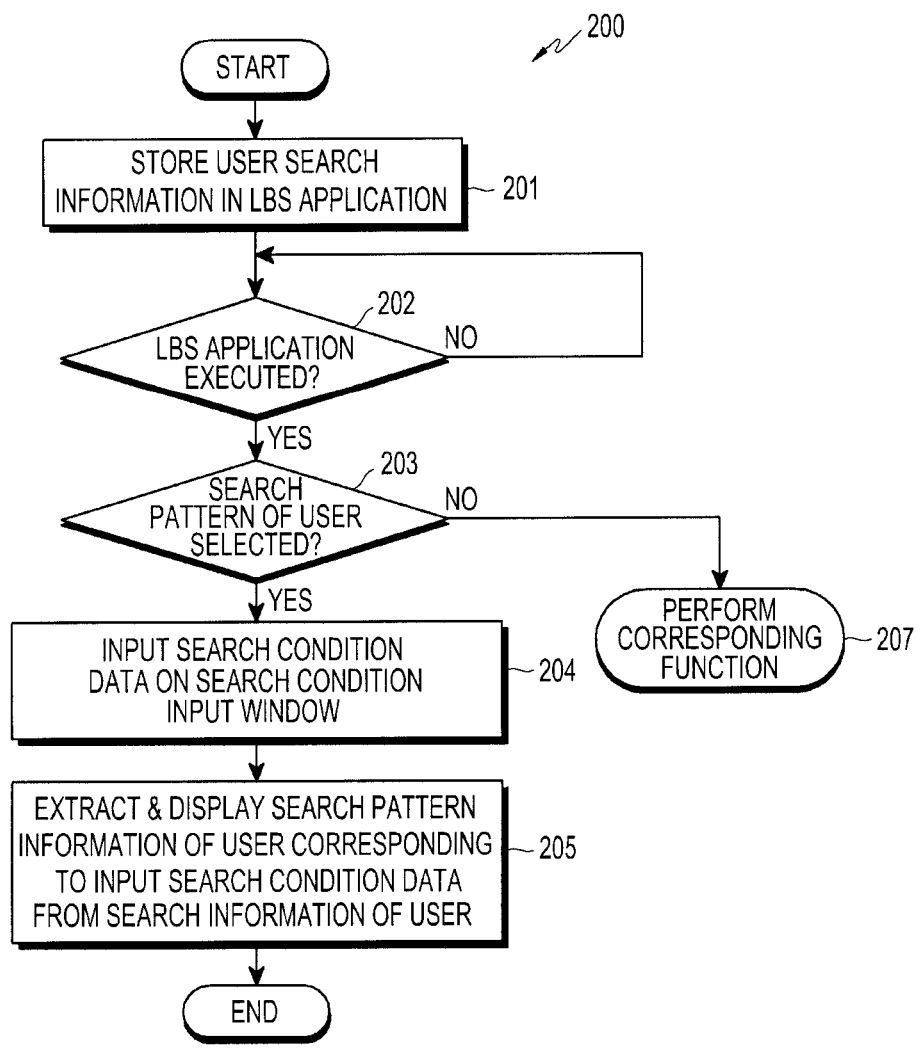
FIG. 2 is a flowchart illustrating an example method for providing search pattern information in a mobile terminal according to an embodiment.
Figure 3:
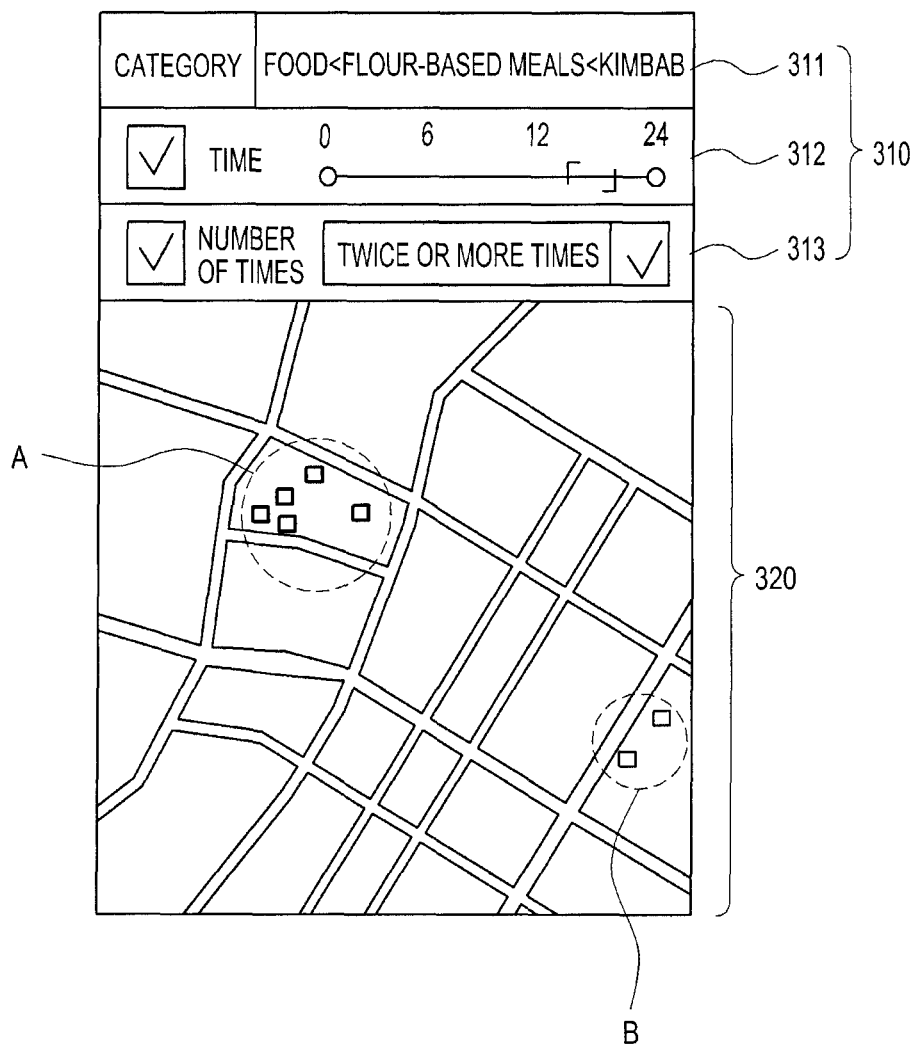
FIG. 3 is an example display screen view illustrating an operation of providing search pattern information in a mobile terminal according to an embodiment.

FIG. 2 is a flowchart illustrating an example method for providing user search pattern information in a mobile terminal according to an embodiment FIG. 3 is an example display screen view illustrating an operation for providing the user search pattern information Referring to FIG. 2 in conjunction with FIG. 1, the controller 110 stores user search information used in an LBS application of the mobile terminal (step 201). For example, if a user inputs a search word to the LBS application of step 201, the controller 110 displays a search place on map data, the search place corresponding to the input search word through location information of the search place. In this case, the controller 110 stores the search word and search results in a memory 130 as the user search information.

Each of the search results can include, e.g., a search result place, location information of the search result place, a search time, a search execution place, a category of a search word, and the number of times searches are attempted.

For example, suppose a user inputs a search word of "Kimbap" (which is in the category of "food/flour-based meals") from inside Samsung Electronics Co. building in Maetandong (i.e., the search execution place) at 18:40 (search time). This search might produce a search result place of "Apgujong Kimbap" (a restaurant name) corresponding to the search for "kimbap", and this shop's location is displayed on the map data. In this case, the controller 110 may store, in connection with this search event, "Kimbap", "Apgujong Kimbap", "18:40", the latitude and longitude of the Samsung Electronics Co. building in Maetan-dong, "food/flour-based meals", and the number "3" representing the third recent search attempt for Kimbap, as a search word, a search result place, location information of a search result place, a category of the search word, the number of times of searches, respectively, as search information of the user for this search event.

In some implementations, the controller 110 may create a list of user search information to which a priority is given according to the frequency of searches. The controller 110 may display the list of user search information on the display unit 160 according to user selection. The list of user search information may be corrected, deleted, or added to by the user. Thus, for example, if a user most frequently selects a particular class of food whenever a broader category of food is presented for selection, that class of food may be designated as the highest priority class.

As described above, in step 201 the controller 110 stores, in memory 130, the user search information used each time a search place corresponding to the input search word is displayed on map data through input of a search word in an LBS application. Thus, it should be understood that step 201 is a search history database building step in which data is collected in LBS applications for many user searches. Furthermore, in this step controller 110 iteratively computes search patterns for the user, establishing priorities for certain categories of searches, particular business establishments, etc. based upon search frequencies in the cumulative user search information. Alternatively or additionally, prioritized search information can be input in step 201 by the user manually.

If the LBS application is newly executed in the mobile terminal, the controller 110 detects the executed LBS application in step 202 and switches the mobile terminal to an LBS application mode.

If a "user search pattern mode" is selected in the LBS application mode, the controller 110 detects the selected user search pattern mode selection in step 203 and switches the mobile terminal to a user search pattern mode. Otherwise, a normal mode LBS function is performed at 207.

The controller 110 displays at least one search condition input window on the display unit 160 in the user search pattern mode. The search condition input window may be at least one of a search result place, location information of the search result place, a search time, a search execution place, a category of a search word, and the number of times of searches. A type of the search condition input window may be changed by the user.

If search condition data are input in the at least one search condition input window in step 204, the controller 110 detects the input search condition data, and extracts and displays at least one user search pattern information corresponding to the at least one input search condition data from the user search information stored in the memory 130 (step 205).

In step 205, the controller 110 may display the user search pattern information on the map data with a marker, and the marker may be displayed together with basic information with respect to at least one user search pattern information.

If the marker displayed on the map data is selected, the controller 110 detects the selected marker and performs a control operation to display detailed information with respect to the selected user search pattern information.

In step 205, the controller 100 may switch the mobile terminal to an augmented reality mode to display the at least one user search pattern information with a specific icon. The specific icon may be displayed together with basic information with respect to the user search pattern information.

If the specific icon displayed in the augmented reality mode is selected, the controller 110 may detect the selected specific icon and perform a control operation so that detailed information with respect to the selected user search pattern information is displayed.

The detailed information with respect to the selected user search pattern information includes at least one of the following: a search place; location information of the search place; a search time; a search execution place; a category of a search word; and the number of search attempts. The basic information is at least one of the detailed information with respect to the selected user search pattern information, which may be selected or changed by the user.

An operation extracting and displaying the foregoing user search pattern information will be described with reference to the example display screen of FIG. 3. This example illustrates aspects of the above described process 200. Under the control of controller 110, display unit 160 displays at least one search condition input window 310 in the user search pattern mode. In the example, search condition data of "food/flour-based meals>kimbab" is selected as a category of a search word on a first search condition input window 311, search condition data of "from 18:00 to 21:00" is selected as a search time on a second condition input window 312, and "more than twice" is selected as the number of search attempts on a third condition input window 313. In response to these selections, the controller 110 may display a search result place on map data displayed on a lower region of the display unit 160. The search result place(s) can be displayed with a least one marker shown as rectangles in the regions A, B as user search pattern information of the user search information stored in the memory 130 corresponding to search condition data input in the search condition input windows 310. In this case, markers of a zone A in which the search result places are concentrated as the user search pattern information may be displayed in an emphasized manner, such as with a distinct color or brightness.

In some implementations, the information for the search result places can be obtained from an LBS server in real time. Alternatively, search result places may be pre-stored in memory 130 of the mobile terminal 100.

The example of FIG. 3 illustrates how a user can save time and effort in searching for desired entities. Suppose a user scrolls to a generic "food" category selection in the LBS application. Conventionally, the user may have to thereafter scroll through many categories of foods to obtain restaurants offering a particular class such as Kimbap. With embodiments described herein, highest priorities of categories can be pre-established, such that when a generic category like "food" is selected, markers for establishments offering Kimbap can be immediately presented on a map due to Kimbap being a top priority, thereby saving the user time and effort in search. Alternatively, the user can be presented with a prioritized list of categories from which to select from, rather than a randomized list.

If a certain marker is selected from markers displayed on the map data, the controller 110 displays the selected user search pattern information.

The user of the mobile terminal may receive advertisements and discount coupons from an enterprise associated with a search word frequently used by the user among the user search pattern information such that the enterprise may generate a marketing effect from the user of the mobile terminal.

For example, while a search result place is being displayed on the display unit 160 as the user search pattern information, the controller 110 may display advertisements for an enterprise associated with search words frequently used by the user among the user search pattern information on a partial region of the display unit 160.

When a marker displayed on map data of the display unit 160 is selected, a fundamental advertisement indicating only simple information with respect to a corresponding business is displayed in the form of a speech balloon pop-up. If the speech balloon pop-up is selected, detailed information of a corresponding business, detailed advertisements indicating event information and discount coupon information may be displayed. When the user selects a partial region of the map data, the controller 160 may display a detailed advertisement of a corresponding located business.

Further, as information of a business having a high search frequency is shared through the Internet, it may be displayed as an advertisement of a popular business in a user search pattern mode of another mobile terminal using the same application.

As yet another example, suppose "from 18:00 to 19:00" and "center gate of the Samsung Electronics Co. building" are input in the search condition input windows 310 as a search time and a search execution place of condition data, respectively. The controller 110 responds by extracting user search pattern information corresponding to the input search condition data from the user search information stored in the memory 130. As a result, the controller 110 may display 'restaurant—fifteen hits 60%, bar—five hits 20%, and bowling alley—five hits 20%' from a center gate of the Samsung Electronics Co. building" at a time interval ranging "from 18:00 to 24:00" on the display unit 160.

Embodiments described herein advantageously provide user search patterns in a mobile terminal, so that a user can easily recognize the user's habit for search words or trend of search execution and search result data in a certain zone.

Further, by analyzing the individual search trend of the user, some implementations may pursue diversity in culture and eating habits, and is variously applicable to assisting a user in developing a healthy lifestyle.

Some implementations can create a list sequentially displaying user search information used in the LBS application from search words having a high priority and search results according to a frequency of particular searches, so as to reduce a time taken to use an LSB and improve efficiency with respect to a User eXperience (UX).

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof of a mobile terminal, it will be understood by those skilled in the art that various changes in form and details may be made therein without departing from the spirit and scope of the invention as defined by the appended claims.

What is claimed is:

1. A mobile terminal, comprising:
a memory configured to store user search information used in a Location Based Service (LBS) application at the mobile terminal;
a display; and
a controller configured to: perform a search if a search request is received from a user in the LBS application, store user search information used during the search, iteratively compute and store in the memory search patterns for the user; and if a specific condition is input by a user, to extract and display via the display user search pattern information, corresponding to the specific condition from the user search information stored in the memory, wherein the user search pattern information is extracted and displayed according to priorities for certain categories of searches or particular entities based upon search frequencies in cumulative search information of the user stored in the memory;
wherein,
the user search information includes at least one of a search word, a search result place, location information of a search place, a search time, a search execution place, a category of a search word, and a number of search attempts;
the user search pattern information is displayed with a marker on geographic map data or in an augmented reality mode, and detailed information with respect to the user search pattern information is displayed when the user search pattern information displayed on the geographic map data or in the augmented reality mode is selected; and
the specific condition is user selectable from a menu displayed on the display containing a plurality of search condition data that, when selected, collectively define the specific condition, the search condition data including:
i) at least one of a category of goods or services, and a specific goods or service; and
ii) at least one of a historical period of a prior search performed at the mobile terminal, and a number of times of searches made at the mobile terminal.

2. The mobile terminal of claim 1, wherein the controller performs a control operation so as to create and display a list of user search information arranged according to priorities given to the user search information according to a frequency of particular searches.

3. The mobile terminal of claim 1, wherein the controller extracts the user search pattern information corresponding to the specific condition from the user search information when the search condition data defining the specific condition are input in at least one search condition input window in a user search pattern mode of the LBS application.

4. The mobile terminal of claim 1, wherein the search condition data includes the historical period of a prior search, and the historical period is an intra-day time range within which the prior search occurred.

5. The mobile terminal of claim 4, wherein the search condition data comprises the number of times of searches made at the mobile terminal.

6. A method implemented in a mobile terminal, comprising:
- storing user search information used in a Location Based Service (LBS) application in a memory at the mobile terminal;
- performing a search if a search request is received from a user in the LBS application, and storing user search information used during the search;
- iteratively computing and storing in the memory search patterns for the user; and
- if a specific condition is input by a user, extracting and displaying user search pattern information corresponding to the specific condition from the stored user search information, according to priorities for certain categories of searches or particular entities based upon search frequencies in cumulative search information of the user stored in the memory;

wherein,
- the user search information includes at least one of a search word, a search result place, location information of a search place, a search time, a search execution place, a category of a search word, and a number of search attempts;
- the user search pattern information is displayed with a marker on geographic map data or in an augmented reality mode, and detailed information with respect to the user search pattern information is displayed when the user search pattern information displayed on the geographic map data or in the augmented reality mode is selected; and
- the specific condition is user selectable from a displayed menu including a plurality of search condition data that, when selected, collectively define the specific condition, the search condition data including:
  i) at least one of a category of goods or services, and a specific goods or service; and
  ii) at least one of a historical period of a prior search performed at the mobile terminal, and a number of times of searches made at the mobile terminal.

7. The method of claim 6, further comprising creating and displaying a list of user search information arranged according to priorities given to the user search information according to a frequency of particular searches.

8. The method of claim 6, wherein extracting of the user search pattern information comprises:
- displaying at least one search condition input window in a user search pattern mode of the LBS application; and
- extracting the user search pattern information corresponding to the search condition data defining the specific condition from the user search information when the search condition data are input in the at least one search condition input window.

9. The method of claim 6, wherein the search condition data includes the historical period of a prior search, and the historical period is an intra-day time range.

10. The method of claim 9, wherein the search condition data comprises the number of times of searches made at the mobile terminal.

* * * * *